United States Patent
Shinoda et al.

(10) Patent No.: US 12,282,196 B2
(45) Date of Patent: Apr. 22, 2025

(54) FERRULE PIN CLAMP, GUIDE PIN-ATTACHED PIN CLAMP, AND OPTICAL CONNECTOR

(71) Applicant: FUJIKURA LTD., Tokyo (JP)

(72) Inventors: Tomoyuki Shinoda, Sakura (JP); Masayuki Hirose, Sakura (JP)

(73) Assignee: Fujikura Ltd., Tokyo (JP)

( * ) Notice: Subject to any disclaimer, the term of this patent is extended or adjusted under 35 U.S.C. 154(b) by 173 days.

(21) Appl. No.: 17/786,934

(22) PCT Filed: Nov. 2, 2020

(86) PCT No.: PCT/JP2020/041065
§ 371 (c)(1),
(2) Date: Jun. 17, 2022

(87) PCT Pub. No.: WO2021/192388
PCT Pub. Date: Sep. 30, 2021

(65) Prior Publication Data
US 2023/0023527 A1    Jan. 26, 2023

(30) Foreign Application Priority Data
Mar. 24, 2020  (JP) .................................. 2020-052242

(51) Int. Cl.
*G02B 6/38* (2006.01)
(52) U.S. Cl.
CPC ......... *G02B 6/3858* (2013.01); *G02B 6/3888* (2021.05)
(58) Field of Classification Search
CPC .................... G02B 6/3858; G02B 6/3888
See application file for complete search history.

(56) References Cited

U.S. PATENT DOCUMENTS

| 6,505,976 B1 * | 1/2003 | Grois ................... G02B 6/3882 |
| | | 385/71 |
| 2014/0105548 A1 * | 4/2014 | Takahashi ............ G02B 6/3833 |
| | | 385/136 |
| 2015/0355419 A1 | 12/2015 | Isenhour et al. |
| 2016/0085045 A1 | 3/2016 | Hill et al. |
| 2017/0160486 A1 * | 6/2017 | Krawczyk ............ G02B 6/3893 |
| 2017/0285277 A1 * | 10/2017 | Chang .................. G02B 6/3826 |

(Continued)

FOREIGN PATENT DOCUMENTS

| CN | 102713710 A | 10/2012 |
| CN | 107615123 A | 1/2018 |

(Continued)

OTHER PUBLICATIONS

International Search Report issued in corresponding International Application No. PCT/JP2020/041065 mailed Feb. 2, 2021 (3 pages).

*Primary Examiner* — Sung H Pak
*Assistant Examiner* — Hoang Q Tran
(74) *Attorney, Agent, or Firm* — Osha Bergman Watanabe & Burton LLP

(57) ABSTRACT

A ferrule pin clamp used for a ferrule into which a guide pin is inserted includes: a main body including a pin holder that holds a groove portion of the guide pin. The pin holder includes a pair of arcs. A diameter of the pair of arcs: is smaller than a maximum shaft diameter of the guide pin, and is larger than a shaft diameter of the groove portion of the guide pin.

8 Claims, 8 Drawing Sheets

(56) References Cited

U.S. PATENT DOCUMENTS

2018/0267255 A1 9/2018 Butler et al.
2018/0306979 A1 10/2018 Armistead
2020/0003961 A1 1/2020 Chang et al.

FOREIGN PATENT DOCUMENTS

| CN | 208140982 U | 11/2018 | |
|---|---|---|---|
| JP | H04-347806 A | 12/1992 | |
| JP | 2013-068976 A | 4/2013 | |
| JP | 2016-139092 A | 8/2016 | |
| WO | 2019/036297 A1 | 2/2019 | |
| WO | WO-2021055532 A1 * | 3/2021 | ........... G02B 6/3825 |

* cited by examiner

FERRULE PIN CLAMP, GUIDE PIN-ATTACHED PIN CLAMP, AND OPTICAL CONNECTOR

TECHNICAL FIELD

The present invention relates to a ferrule pin clamp, a guide pin-attached pin clamp, and an optical connector.

Priority is claimed on Japanese Patent Application No. 2020-052242, filed on Mar. 24, 2020, the content of which is incorporated herein by reference.

BACKGROUND

A guide pin used for a multi-fiber optical connector is held in an optical connector by a fixing member such as a pin clamp. For example, Patent Document 1 discloses an optical connector in which a guide pin gripping component is disposed behind a multi-fiber connector core part (ferrule).

PATENT LITERATURE

[Patent Document 1]
Japanese Unexamined Patent Application, First Publication No. H4-347806

Whereas the shaft diameter of a guide pin used for a multi-fiber optical connector having 12 fibers or 24 fibers (12 fibers×2 rows) is approximately 0.7 mm, the shaft diameter of a guide pin used for a multi-fiber optical connector having 16 fibers is approximately 0.5 mm. The reason is as follows. The number of optical fibers aligned in a row between the guide pins increases, thereby limiting the diameter of the guide pin. When the shaft diameter of the guide pin is thin, it may be difficult to design a flange in the guide pin itself. Therefore, a guide pin-attached pin clamp is generally manufactured by attaching the guide pin to a pin clamp that clamps the guide pin.

The guide pin is inserted into a guide pin hole of the ferrule so that the guide pin-attached pin clamp is held by a ferrule. In this case, for example, in the guide pin-attached pin clamp having a pair of the guide pins, when a pitch width of the guide pin holes of the ferrule and a pitch width of the guide pins held by the pin clamp are different from each other, the guide pins may not be parallel to each other. In this case, the guide pins are obliquely deformed in a form in which the pitch width of a tip portion of the guide pins protruding forward of the ferrule is narrower or wider than the pitch width of a rear end portion of the guide pins held by the pin clamp behind the ferrule.

When the multi-fiber optical connectors are connected in a state where the guide pins are deformed, the ferrules are not fitted to each other on a unified plane. Consequently, tip surfaces of the optical fibers held by the respective ferrules are not connected to each other through physical contact (PC), thereby causing poor optical characteristics such as an insertion loss.

SUMMARY

The present invention is made in view of the above-described circumstances, and one or more embodiments of the present invention provide a ferrule pin clamp, a guide pin-attached pin clamp, and an optical connector which can suppress poor optical characteristics.

According to one or more embodiments of the present invention, there is provided a ferrule pin clamp used for a ferrule into which a guide pin is inserted. The ferrule pin clamp includes a main body including a pin holder that holds a groove portion of the guide pin. The pin holder includes a pair of arcs. The pair of arcs of the pin holder is smaller than a maximum shaft diameter of the guide pin, and is larger than a shaft diameter of the groove portion of the guide pin.

In addition, according to one or more embodiments of the present invention, there is provided a ferrule pin clamp used for a ferrule into which two guide pins are inserted. The ferrule pin clamp includes a main body including pin holders that hold groove portions of the guide pins. The main body is separated into two pieces. The main body includes a first piece that supports a first guide pin of the two guide pins and a second piece that supports a second guide pin of the two guide pins.

In addition, according to one or more embodiments of the present invention, there is provided a guide pin-attached pin clamp including the ferrule pin clamp and the guide pin in which the groove portion held by the pin holder is formed.

In addition, according to one or more embodiments of the present invention, there is provided an optical connector including the ferrule pin clamp, the guide pin in which the groove portion held by the pin holder is formed, and a ferrule into which the guide pin is inserted.

According to the above-described embodiments of the present invention, it is possible to provide the ferrule pin clamp, the guide pin-attached pin clamp, and the optical connector which can suppress poor optical characteristics.

DETAILED DESCRIPTION

Hereinafter, the present invention will be described with reference to the drawings, based on embodiments.
(Pin Clamp of First Embodiments)

Figure 1:
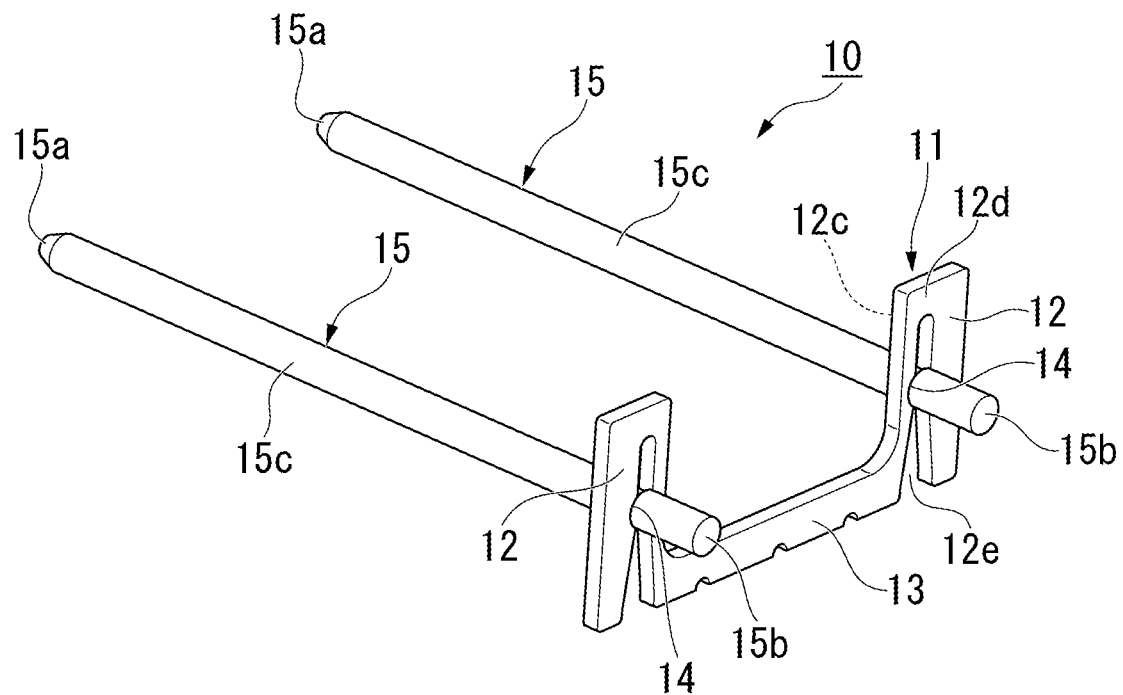
FIG. 1 is a perspective view showing a guide pin on which a pin clamp of one or more embodiments is attached.
Figure 2:
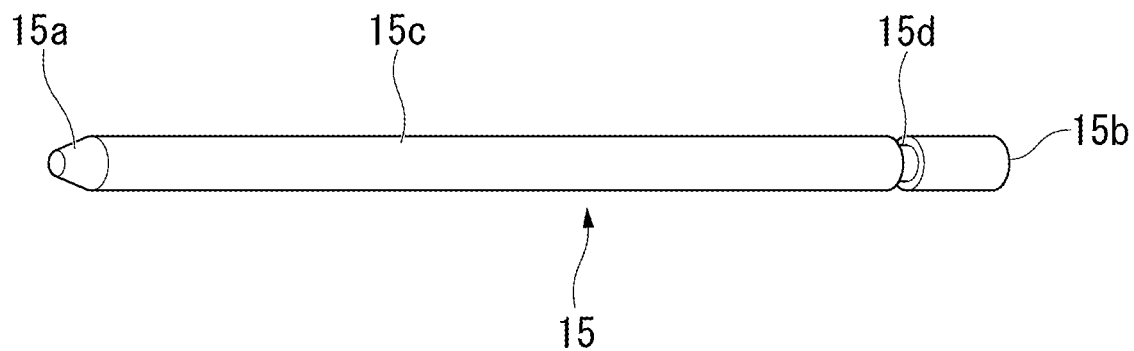
FIG. 2 is a perspective view showing an example of the guide pin.
Figure 3:
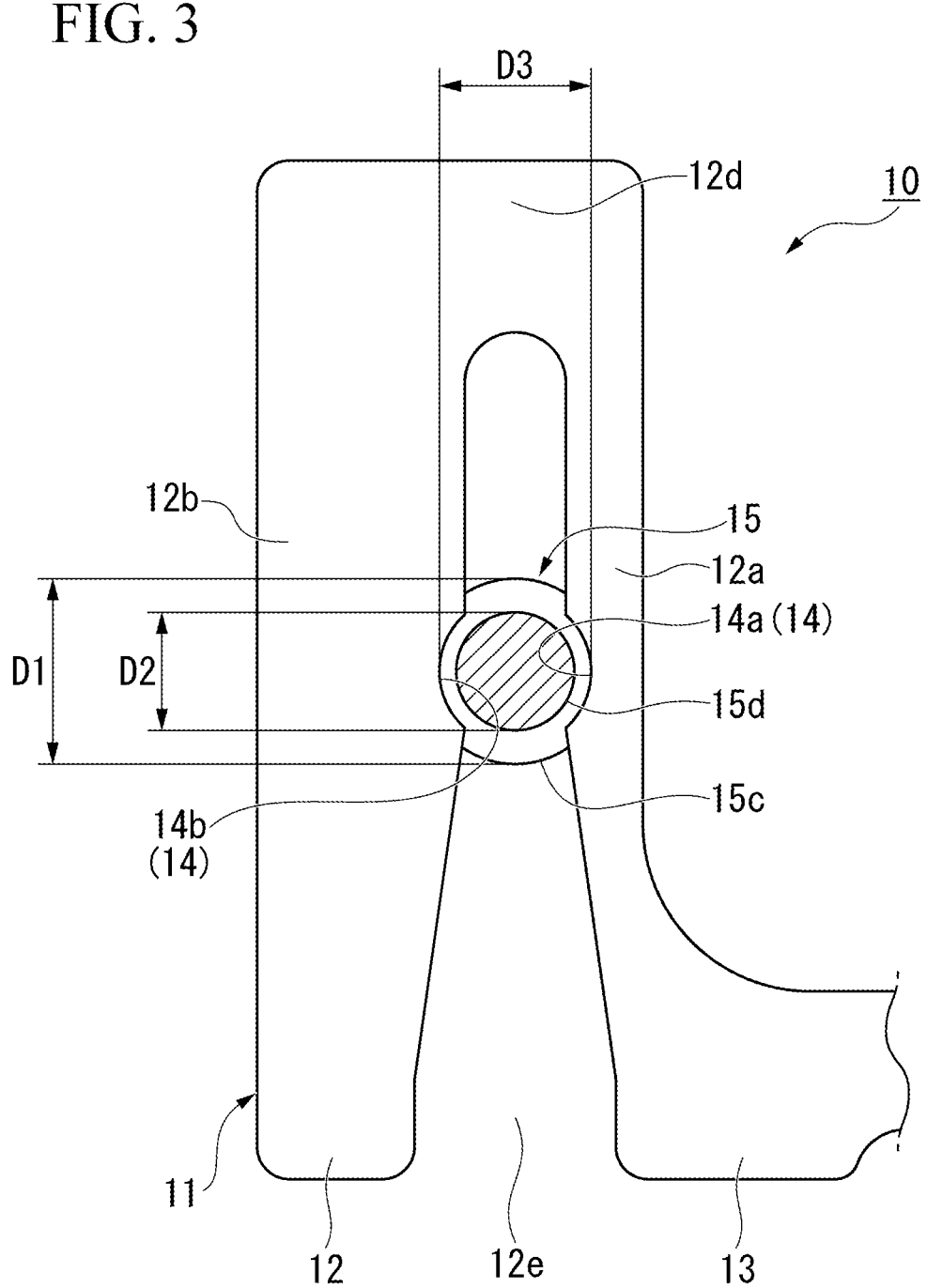
FIG. 3 is a partially enlarged view showing a main body of the pin clamp.
Figure 4:
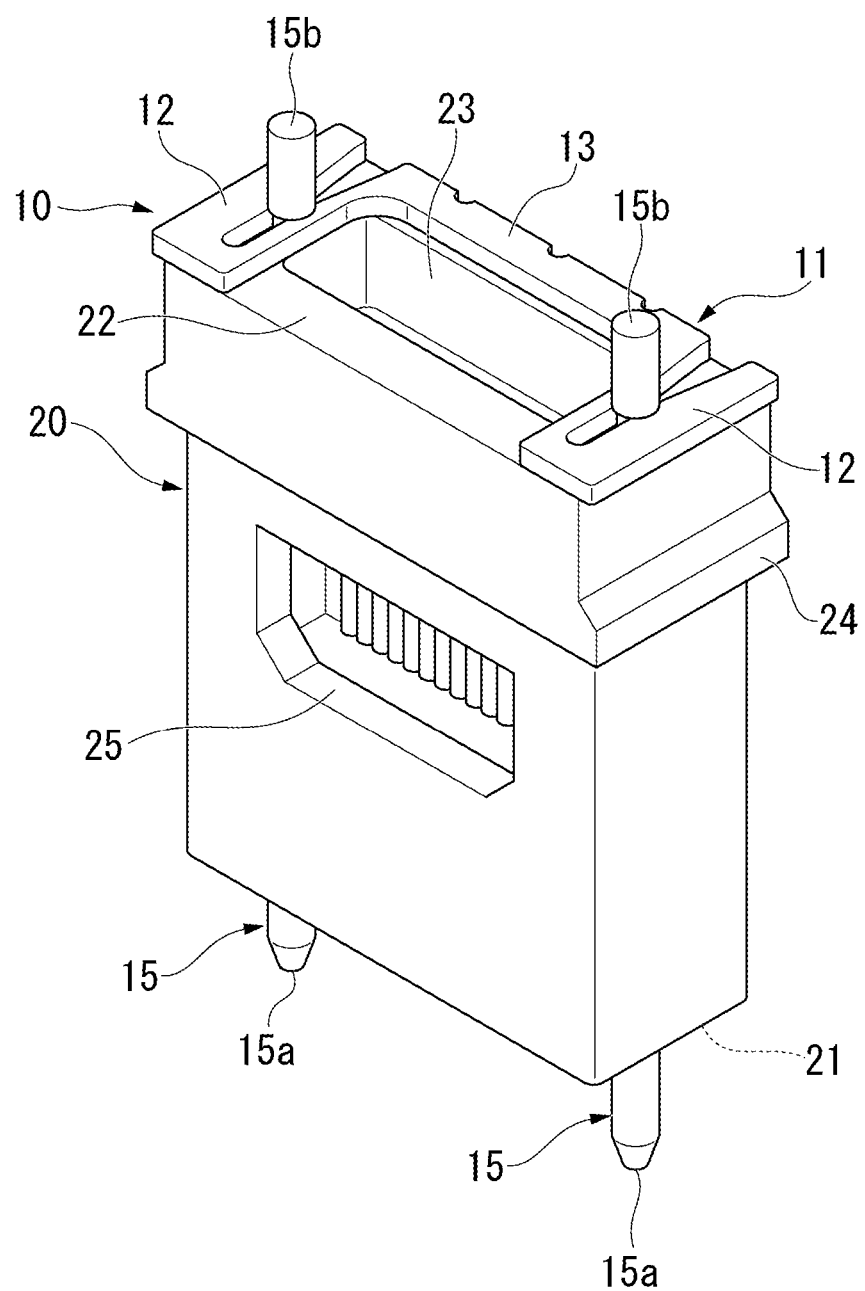
FIG. 4 is a perspective view showing a ferrule including the pin clamp of one or more embodiments.
Figure 5:
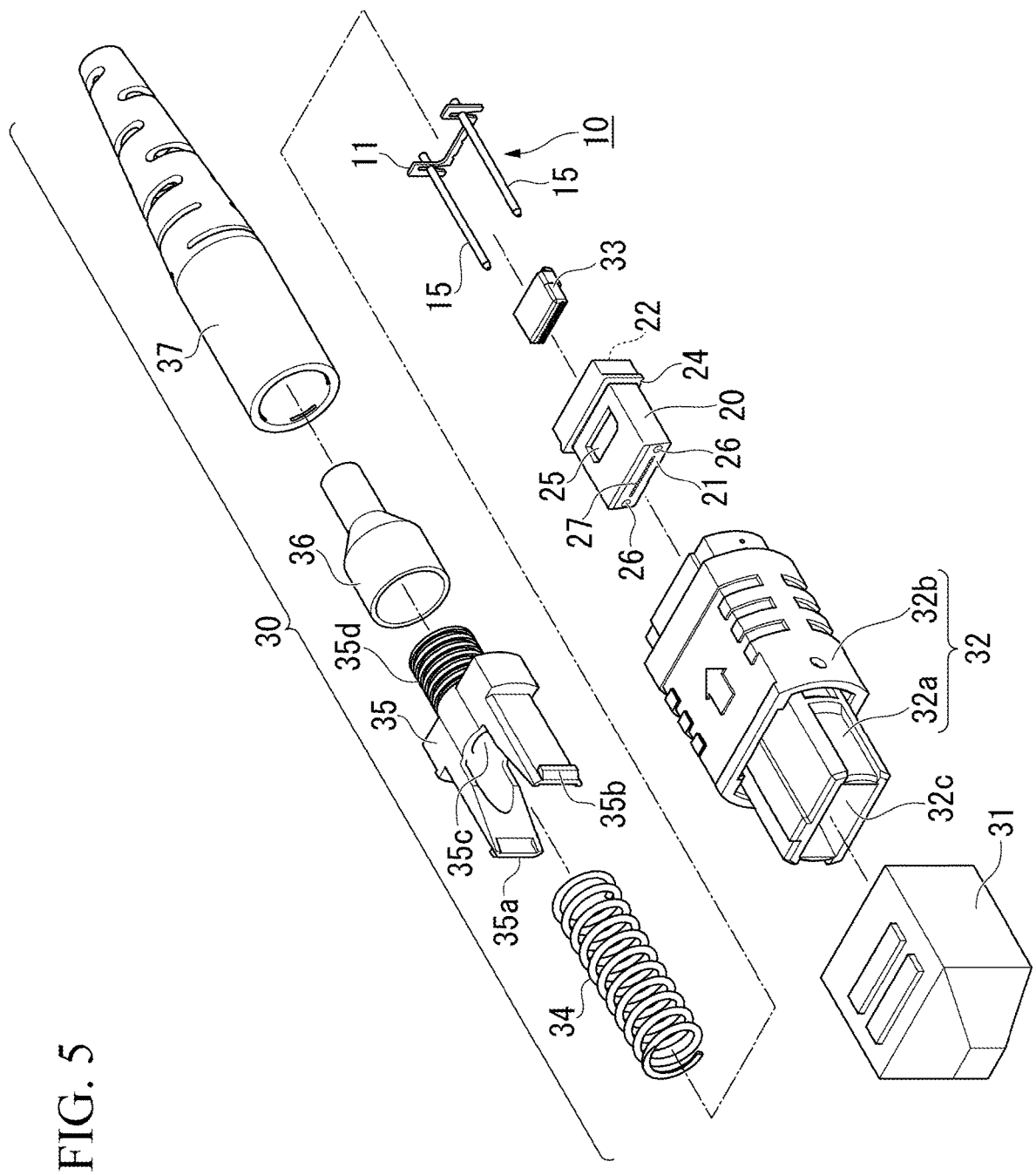
FIG. 5 is an exploded perspective view showing an optical connector including the pin clamp of one or more embodiments.

FIG. 1 shows a guide pin-attached pin clamp 10 having a pin clamp 11 of one or more embodiments and a guide pin 15. The pin clamp 11 of one or more embodiments is configured so that the guide pin 15 can be attached thereon. FIG. 2 shows an example of the guide pin 15. FIG. 3 shows a partially enlarged main body 12 of the pin clamp 11. FIG. 4 shows a ferrule 20 including the pin clamp 11. FIG. 5 shows an optical connector 30 including the pin clamp 11.

The pin clamp 11 is a ferrule pin clamp used for the ferrule 20 into which the guide pin 15 is inserted. The guide pin-attached pin clamp 10 has a configuration in which the pin clamp 11 is attached on the guide pin 15.

The ferrule 20 includes guide pin holes 26 (refer to FIG. 5). When the guide pin 15 is inserted into the guide pin hole 26, a tip portion 15a of the guide pin 15 protrudes forward from a connection end surface 21 of the ferrule 20, and a rear end portion 15b of the guide pin 15 protrudes rearward from a rear end surface 22 of the ferrule 20 (refer to FIG. 4).

An insertion hole 23 into which an optical fiber is inserted is open on the rear end surface 22 of the ferrule 20.

(Direction Definition)

In the following description, a front side indicates a direction from the rear end surface 22 toward the connection end surface 21 of the ferrule 20, and a rear side indicates a direction from the connection end surface 21 toward the rear end surface 22 of the ferrule 20. In addition, similarly, in the description of the guide pin 15, a front side indicates a direction from the rear end portion 15b toward the tip portion 15a, and a rear side indicates a direction from the tip portion 15a toward the rear end portion 15b.

In addition, in the guide pin-attached pin clamp 10 and the pin clamp 11, a direction in which the two guide pins 15 are aligned will be referred to as a width direction.

The pin clamp 11 includes a main body 12 that supports the guide pin 15. The main body 12 has a plate shape, and a position of the guide pin 15 in a forward-rearward direction can be determined by bringing a front surface 12c (refer to FIG. 1) of the main body 12 into contact with the rear end surface 22 of the ferrule 20. In addition, it is possible to suppress a possibility that the guide pin 15 may fall out forward of the ferrule 20.

The pin clamp 11 includes two main bodies 12 and a connection portion 13 for connecting the two main bodies 12. The main bodies 12 each hold the guide pin 15 inserted into the ferrule 20. Here, in an example in FIG. 1, the number of the guide pins 15 inserted into the ferrule 20 is two. Accordingly, the number of the main body 12 is two. However, without being limited to two, the number of the main body 12 may be one, three, or more, depending on the number of the guide pins 15 to be used.

A shape of the pin clamp 11 may be disposed on a peripheral edge portion of the ferrule 20 by avoiding a position of the insertion hole 23 that is open on the rear end surface 22 of the ferrule 20.

As represented in FIG. 2, the guide pin 15 includes a substantially columnar shaft portion 15c and a groove portion 15d held by the main body 12. The tip portion 15a of the guide pin 15 may have a tapered shape. The rear end portion 15b behind the groove portion 15d of the guide pin 15 may have a diameter approximately the same as that of the shaft portion 15c.

As represented in FIG. 3, a cutout 12e that accommodates the guide pin 15 is formed in the main body 12 of the pin clamp 11. In addition, the main body 12 includes a first arm portion 12a connected to the connection portion 13, a bottom portion 12d of the cutout 12e, and a second arm portion 12b connected to the first arm portion 12a via the bottom portion 12d.

The pin clamp 11 and the main body 12 can be formed of an elastic material such as sheet metal. For example, the pin clamp 11 may be formed by punching a metal plate. The main body 12 and the connection portion 13 may be formed of the same metal plate. A configuration can be adopted so that the main body 12 and the connection portion 13 have an equal thickness.

When the guide pin-attached pin clamp 10 is viewed in the forward-rearward direction, the cutout 12e is formed to extend in an upward-downward direction orthogonal to the width direction in which the two guide pins 15 are aligned.

In addition, the cutout 12e is open on a side closer to the connection portion 13. In an example in FIG. 3, in the cutout 12e, an opening portion whose width is gradually narrowed from an opening end toward the bottom portion 12d side, a pin holder 14, and a cutout bottom portion are formed in this order. In the cutout bottom portion, the width of the cutout may be constant. A shape of the cutout 12e is not limited to the example represented in FIG. 3, and at least the pin holder 14 may be formed.

The main body 12 includes the pin holder 14 that holds the guide pin 15. The pin holder 14 of one or more embodiments engages with the groove portion 15d of the guide pin 15, and holds the guide pin 15. The pin holder 14 is a pair of recessed portions facing each other in the width direction of the cutout 12e, and is recessed in an arc shape from the cutout 12e.

The pin holder 14 includes a first arc 14a disposed on the first arm portion 12a side and a second arc 14b disposed on the second arm portion 12b side. The first arc 14a and the second arc 14b may be arcs on the same circumference of a circle. A central angle of the arc included in the first arc 14a and a central angle of the arc included in the second arc 14b are not particularly limited. For example, the central angle is equal to or larger than 30°, and is smaller than 180°. When a sum of the central angle of the first arc 14a and the central angle of the second arc 14b does not exceed 360°, either one of the central angle may exceed 180°. In the width direction of the cutout 12e, the central angles of the two arcs may be set so that a distance between arc end portion of the first arc 14a and arc end portion of the second arc 14b is equal to a shaft diameter D2 of the groove portion 15d of the guide pin 15 or smaller than the shaft diameter D2.

For example, a maximum shaft diameter D1 of the guide pin 15 is the shaft diameter of the shaft portion 15c and the rear end portion 15b. The maximum shaft diameter D1 is larger than the shaft diameter D2 of the groove portion 15d of the guide pin 15. A diameter D3 of the first arc 14a and the second arc 14b of the pin holder 14 is smaller than the maximum shaft diameter D1 of the guide pin 15, and is larger than the shaft diameter D2 of the groove portion 15d.

The diameter D3 of the arc of the pin holder 14 is smaller than the maximum shaft diameter D1 of the guide pin 15. That is, both the shaft diameter of the shaft portion 15c located in front of the groove portion 15d and the shaft diameter of the rear end portion 15b located behind the groove portion 15d are larger than the diameter D3 of the arc of the pin holder 14. When the groove portion 15d is held by the pin holder 14, the shaft portion 15c and the rear end portion 15b of the guide pin 15 cannot pass through the pin holder 14. That is, the guide pin 15 is held to be prevented from falling out forward and rearward. A holding force of the guide pin 15 held by the pin holder 14 may be 19.6 N or higher.

The diameter D3 of the arc of the pin holder 14 is larger than the shaft diameter D2 of the groove portion 15d. In this manner, a degree of freedom which enables the groove portion 15d to be displaced inside the pin holder 14 in a radial direction is secured inside the pin holder 14. In this manner, even when a pitch width of the guide pin holes 26 of the ferrule 20 is different from a pitch width of the guide pins 15 held by the pin clamp 11, poor optical characteristics when connected by connectors can be suppressed by suppressing deformation of the guide pin 15.

A clearance of the pin holder 14 from the shaft diameter D2 of the groove portion 15d of the guide pin 15 may be 0.13 mm or smaller. That is, D3−D2 which is a difference between the diameter D3 of the arc of the pin holder 14 and the shaft diameter D2 of the groove portion 15d may be 0.13 mm or smaller. In this manner, it is possible to avoid a possibility that the degree of displacement freedom of the groove portion 15d may excessively increase.

A clearance of the pin holder 14 from the shaft diameter D2 of the groove portion 15d of the guide pin 15 may be 0.01 mm or larger. That is, D3–D2 which is a difference between the diameter D3 of the arc of the pin holder 14 and the shaft diameter D2 of the groove portion 15d may be 0.01 mm or larger. In this manner, the degree of freedom of the groove portion 15d can be more satisfactorily secured.

The clearance between the pin holder 14 and the shaft diameter D2 of the groove portion 15d of the guide pin 15 may be 0.05 mm or larger. That is, D3–D2 which is a difference between the diameter D3 of the arc of the pin holder 14 and the shaft diameter D2 of the groove portion 15d may be 0.05 mm or larger. In this manner, the degree of freedom of the groove portion 15d can be more satisfactorily secured.

Figure 6:
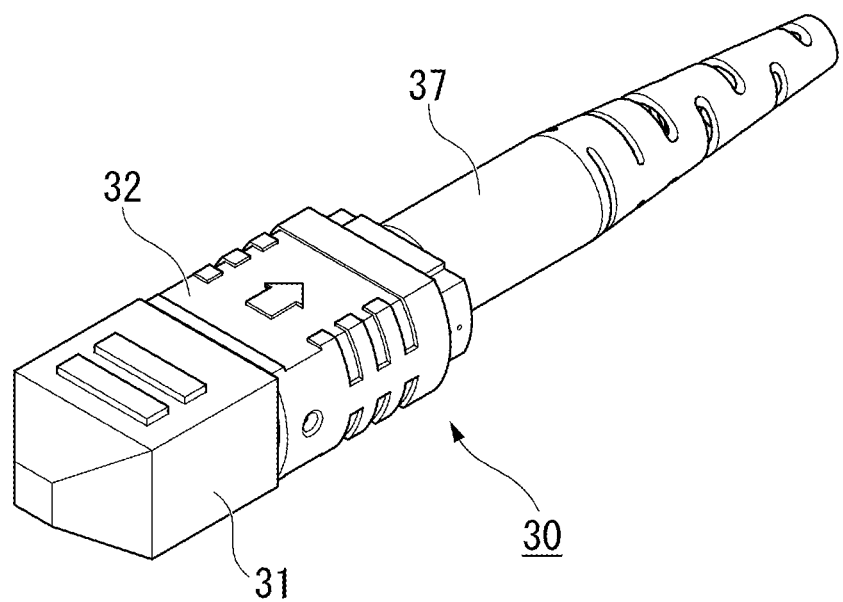
FIG. 6 is a perspective view showing an exterior of the optical connector.

As represented in FIG. 5, in addition to the guide pin-attached pin clamp 10 and the ferrule 20, the optical connector 30 includes a cap 31, a housing 32, a ferrule boot 33, a spring 34, a spring push 35, a crimp ring 36, and a cable boot 37. FIG. 6 shows an exterior of the optical connector 30 in an assembled state.

The cap 31 is attached on a front side of the housing 32 to protect the inside of an opening 32c from dust or the like. The housing 32 includes a plug frame 32a for accommodating the ferrule 20 and a coupling 32b attached on an outer periphery of the plug frame 32a.

The ferrule boot 33 protects an optical fiber (not shown) inserted into the insertion hole 23 (refer to FIG. 4) of the ferrule 20. A flange 24 of the ferrule 20 engages with a projection portion (not shown) provided inside the plug frame 32a to prevent the ferrule 20 from falling out of the opening 32c of the plug frame 32a.

The spring 34 biases the ferrule 20 forward. The spring push 35 has front side engagement portions 35a and 35b engage with the plug frame 32a so that a rear side receiving portion 35c receives a reaction force of the spring 34.

The crimp ring 36 fixes a tensile strength fiber of an optical fiber cable (not shown) by using a rear end portion 35d of the spring push 35. The cable boot 37 protects an outer periphery of the optical fiber cable.

The optical fibers installed in the optical fiber cable are inserted into the ferrule 20, and are fixed by an adhesive injected from a window 25 of the ferrule 20. A tip portions of the optical fibers are inserted into optical fiber holes 27 which are open on the connection end surface 21 of the ferrule 20. After the tip portions of the optical fibers are inserted into and fixed to the optical fiber holes 27, the connection end surface 21 may be polished together with the tip portions of the optical fibers protruding from the connection end surface 21.

(Connection Between Optical Connectors 30)

The optical connectors 30 are connected each other so as to face the two ferrules 20 with each other. In this case, in the first ferrule 20, the guide pins 15 are inserted into the guide pin holes 26. The tip portions 15a of the guide pins 15 protrude from the connection end surface 21 of the first ferrule 20. The guide pin 15 is not inserted into the second ferrule 20, and the guide pin holes 26 are open on the connection end surface 21.

The tip portions 15a of the guide pins 15 of the first ferrule 20 are inserted into the guide pin holes 26 of the second ferrule 20 so that the ferrules 20 are mechanically coupled to each other. When the ferrule 20 having the guide pin 15 and the ferrule 20 having no guide pin 15 are coupled to each other, the pin clamp 11 may be provided in the ferrule 20 having the guide pin 15, and the pin clamp 11 of the ferrule 20 having no guide pin 15 may be omitted.

The pitch widths of the guide pin holes 26 of each of ferrules 20 are substantially the same. Therefore, the pitch width of the tip portions 15a of the guide pins 15 protruding forward of one ferrule 20 may be substantially the same as the pitch width of the guide pin holes 26. However, as described above, when the guide pin 15 is deformed so that the pitch width of the tip portions 15a is narrower or wider than the pitch width of the guide pin holes 26, the ferrules 20 are poorly fitted to each other. Therefore, tip surfaces of the optical fibers are not connected to each other by a PC, thereby causing poor optical characteristics such as an insertion loss.

The pin clamp 11 of one or more embodiments includes arcs 14a and 14b in which the pin holder 14 for holding the shaft portion 15c of the guide pin 15 has a larger diameter than the shaft diameter of the groove portion 15d. According to this configuration, the degree of freedom of the guide pin 15 in the pin holder 14 can be improved by a gap formed between the pin holder 14 and the groove portion 15d of the guide pin 15. In this manner, even when a pitch width of the guide pin holes 26 of the ferrule 20 is different from a pitch width of the guide pins 15 held by the pin clamp 11, poor optical characteristics when connected by a connector can be suppressed by suppressing deformation of the guide pin 15.

(Pin Clamp of Second Embodiments)

Second embodiments of the present invention will be described with reference to FIGS. 7 and 8.

Figure 7:
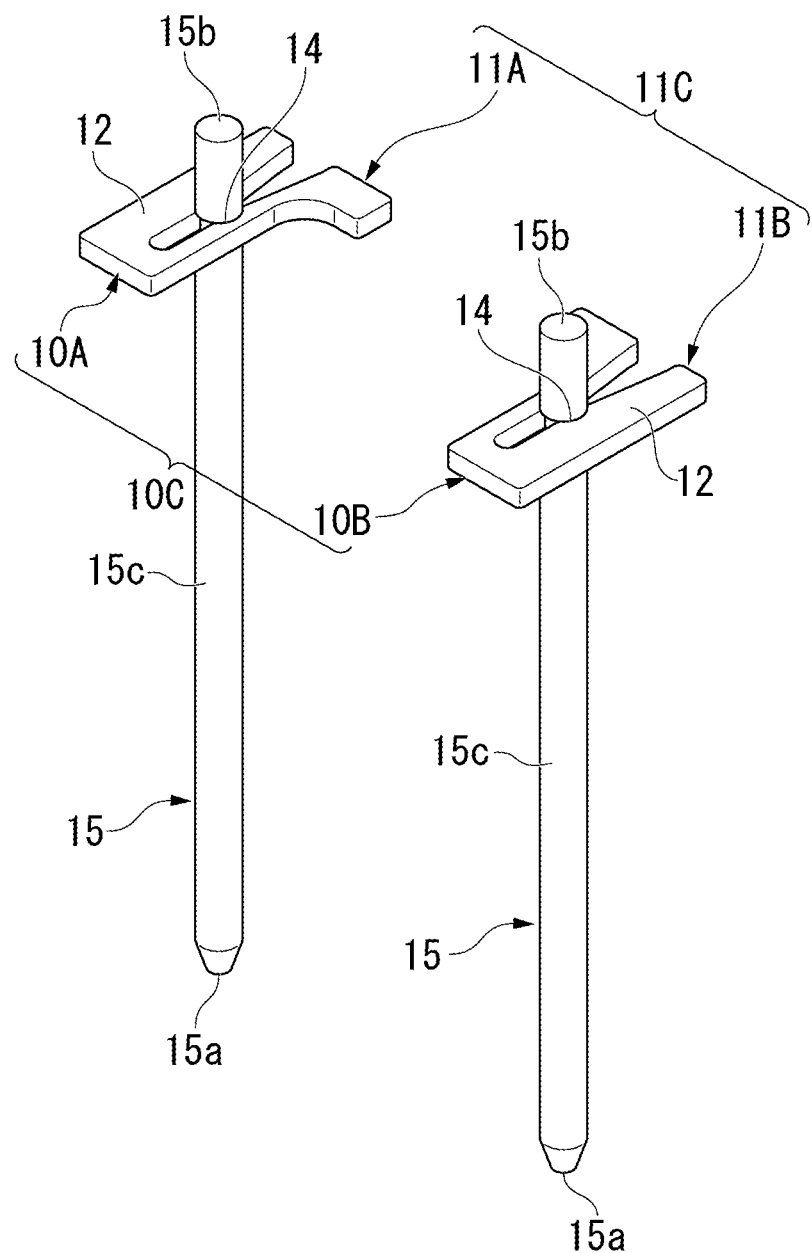
FIG. 7 is a perspective view showing a guide pin on which a pin clamp of one or more embodiments is attached.
Figure 8:
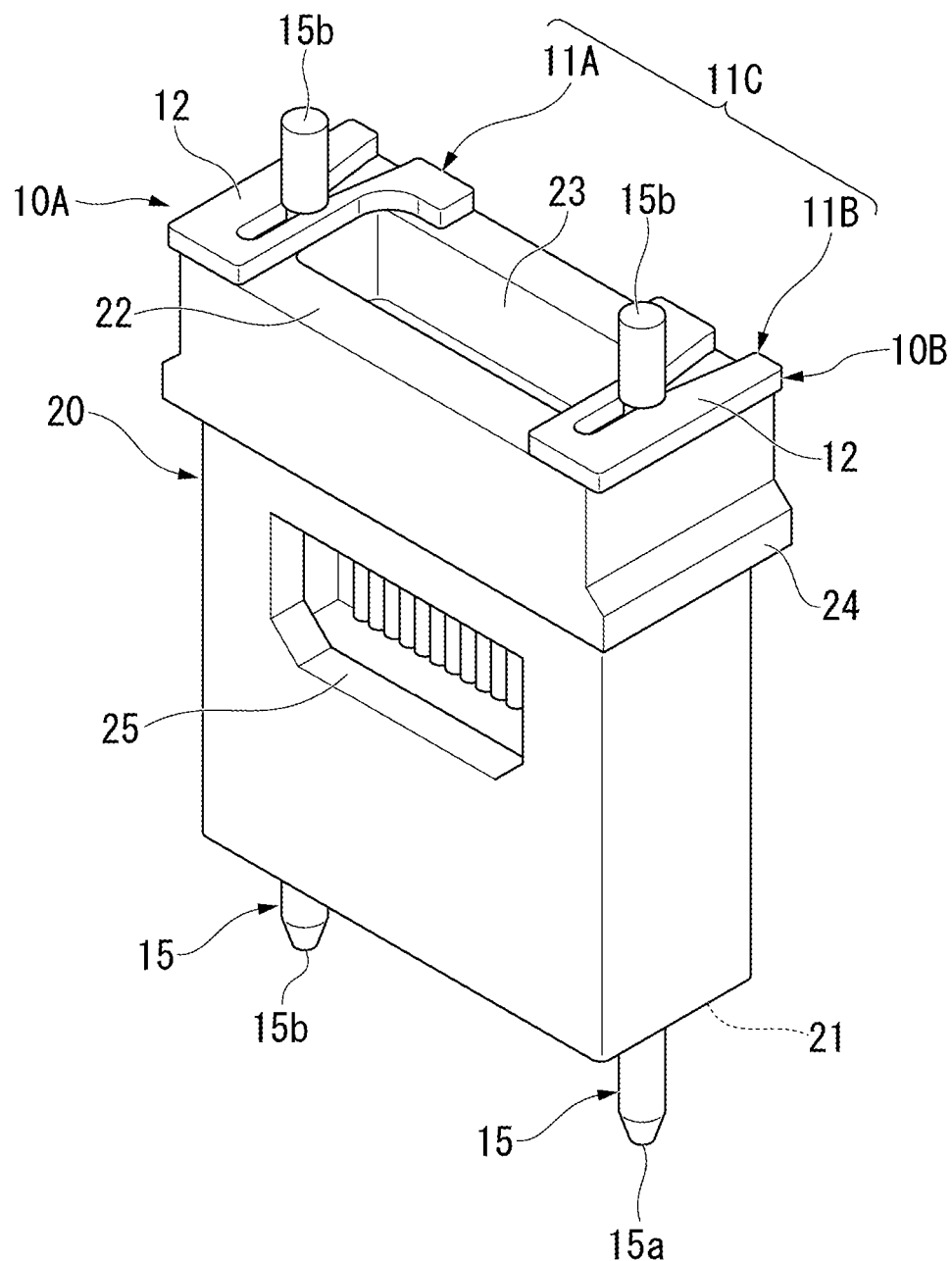
FIG. 8 is a perspective view showing a ferrule including the pin clamp of one or more embodiments.

FIG. 7 shows the guide pin 15 on which a pin clamp 11C of one or more embodiments is attached. FIG. 8 shows the ferrule 20 including the pin clamp 11C. The pin clamp 11C is a ferrule pin clamp used for the ferrule 20 into which the guide pin 15 is inserted. A guide pin-attached pin clamp 10C is configured so that the pin clamp 11C is attached on the guide pin 15.

With regard to the guide pin 15, the ferrule 20, and the optical connector 30, the second embodiments can adopt a configuration other than the pin clamp 11C, for example, the same configuration as those of the first embodiments. Therefore, the same reference numerals may be assigned to the above-described common configurations, and repeated description may be omitted in some cases.

The pin clamp 11C is used for the ferrule 20 into which the two guide pins 15 are inserted. The main body 12 of the pin clamp 11C is separated into two pieces for each of the guide pins 15. That is, a first pin clamp (first piece) 11A and a second pin clamp (second piece) 11B are separate pieces. The first pin clamp 11A includes a first main body 12 for supporting the first guide pin 15, and the second pin clamp 11B includes a second main body 12 for supporting the second guide pin 15.

The first pin clamp 11A and the second pin clamp 11B may have the same shape, or may have a laterally symmetrical shape. The pin clamps 11A and 11B in the represented example have mutually symmetrical shapes in a pitch width direction as a rightward-leftward direction. A first guide pin-attached pin clamp 10A is configured so that the first pin clamp 11A is attached on the first guide pin 15. A second guide pin-attached pin clamp 10B is configured so that the second pin clamp 11B is attached on the second guide pin 15.

The optical connector of one or more embodiments at least includes: the pin clamp 11C in which the main body 12 is separated into individual pieces; the guide pins 15 each held by the pin holder 14 of the main body 12; and the ferrule 20 into which the guide pins 15 are inserted. The first guide pin-attached pin clamp 10A and the second guide pin-attached pin clamp 10B are not connected to each other. Therefore, when the guide pin-attached pin clamps 10A and 10B are inserted into the guide pin holes 26 (refer to FIG. 5) of the ferrule 20, the pitch width of the guide pins 15 is adjusted to the pitch width of the guide pin holes 26.

When the pin clamp 11C of one or more embodiments is used, the degree of freedom between the guide pins 15 can be improved when the guide pin 15 is inserted into the ferrule 20. In this manner, the degree of freedom can be improved so that the pitch width of the guide pin holes 26 of the ferrule 20 is not different from the pitch width of the guide pins 15 held by the pin clamp 11. Therefore, poor optical characteristics when connected by a connector can be suppressed by suppressing deformation of the guide pin 15.

In the pin clamp 11C of the second embodiments, as in the pin clamp 11 of the first embodiments, the diameter D3 of the first arc 14a and the second arc 14b of the pin holder 14 can be configured to be smaller than the maximum shaft diameter D1 of the guide pin 15. In this manner, when the groove portion 15d is held by the pin holder 14, the shaft portion 15c and the rear end portion 15b of the guide pin 15 cannot pass through the pin holder 14. Therefore, the guide pin 15 is held to be prevented from falling out forward and rearward.

In addition, in the pin clamp 11C of the second embodiments, as in the pin clamp 11 of the first embodiments, the diameter D3 of the first arc 14a and the second arc 14b of the pin holder 14 can be configured to be larger than the shaft diameter D2 of the groove portion 15d. In this manner, inside the pin holder 14, the groove portion 15d has the degree of freedom which enables the groove portion 15d to be displaced in the radial direction between the first arc 14a and the second arc 14b. Therefore, poor optical characteristics can be suppressed by suppressing deformation of the guide pin 15.

In addition, the pin clamp 11C of one or more embodiments can also be configured so that the diameter D3 of the first arc 14a and the second arc 14b of the pin holder 14 is equal to or smaller than the shaft diameter D2 of the groove portion 15d. In this case, the pin holder 14 can be configured to elastically hold the guide pin 15. In this manner, the guide pin 15 can be more reliably held by the pin holder 14. In addition, the pin holder 14 can be configured not only to elastically hold the guide pin 15, but also to fix the guide pin 15 by using an adhesive or the like.

In this way, a case of the pin clamp 11C of one or more embodiments may adopt a configuration in which the shaft portion 15c of the guide pin 15 is fixed to the pin holder 14 without providing the groove portion 15d in the guide pin 15.

Hitherto, the present invention has been described, based on the embodiments. However, the present invention is not limited to the above-described embodiments, and various modifications can be made within a scope not departing from the concept of the present invention.

Examples of the optical connector to which the pin clamp of the above-described embodiments is applicable include an MT connector stipulated by JIS C 5981 (F12 type multi-fiber optical fiber connector), an MPO connector stipulated by JIS C 5982 (F13 type multi-fiber optical fiber connector), a Mini-MPO connector stipulated by JIS C 5984 (F15 type optical fiber connector), a MiniMT connector stipulated by JIS C 5987 (F18 type optical fiber connector), and an MT-RJ connector stipulated by JIS C 5988 (F19 type optical fiber connector).

In addition, the pin clamp of the above-described embodiments is also applicable to other optical connectors having the ferrule suitable for JIS C 5964-5 (optical fiber connector mating standard—Part 5: MT connectors (F12 type)), JIS C 5964-7-1 (optical fiber connector mating standard—Part 7-1: MPO connectors (F13 type)—1 row)), JIS C 5964-7-2 (optical fiber connector mating standard—Part 7-2: MPO connectors (F13 type)—2 rows)), and JIS C 5964-18 (optical fiber connector mating standard—Part 18: MT-RJ connectors (F19 type)).

Without being limited to standard products, a structure of the optical connector is also applicable to other applied shapes and new shapes. The number of the guide pins included in one ferrule is not limited to two, and may be three or more.

EXAMPLES

Hereinafter, contents of the present invention will be described in more detail with reference to examples. However, the present invention is not limited to the following examples.

Example 1

The pin clamp in which the pair of arcs of the pin holder has the diameter of 0.45 mm (+0.03 mm/−0 mm) is manufactured by using the sheet metal. The diameter of the pair of arcs of the pin holder is smaller than the maximum shaft diameter of the guide pin, and is larger than the shaft diameter of the groove portion of the guide pin. The shaft diameter of the groove portion of the guide pin is 0.35 mm (+0 mm/−0.05 mm).

Comparative Example 1

The pin clamp in which the pair of arcs of the pin holder has the diameter of 0.37 mm (+0.03 mm/−0 mm) is manufactured by using the sheet metal. The shaft diameter of the groove portion of the guide pin is 0.35 mm (+0 mm/−0.05 mm).

Figure 9:
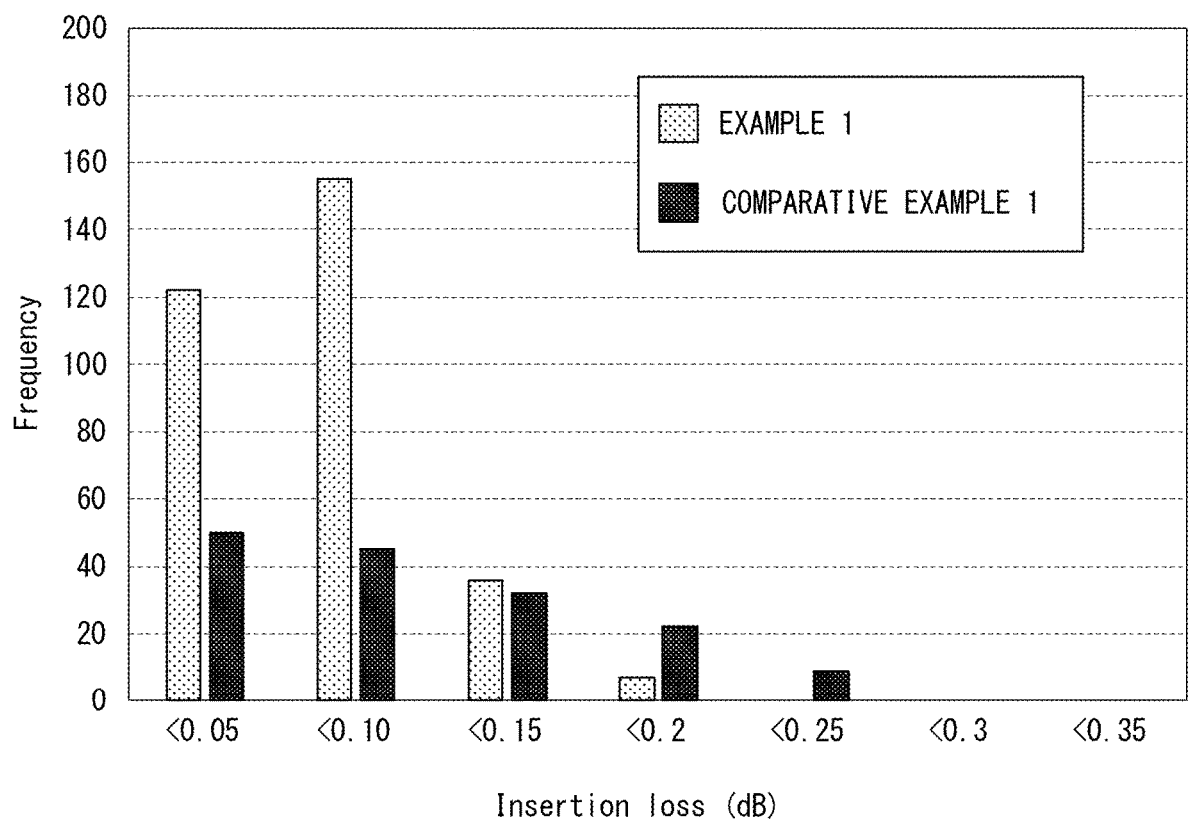
FIG. 9 is a graph showing a measurement result of an insertion loss.

The guide pins are held by the pin clamps of Example 1 and Comparative Example 1, and the guide pins are inserted into the ferrules to form the optical connectors. The insertion loss (dB) of the optical connector is measured to prepare a histogram. A graph indicating a result is represented in FIG. 9. According to the optical connector using the pin clamp of Example 1, the insertion loss of the optical connector decreases, compared to the optical connector using the pin clamp of Comparative Example 1. In addition, according to the optical connector using the pin clamp of Example 1, the insertion loss of the optical connector can be suppressed to be smaller than 0.2 dB. That is, according to the pin clamp of Example 1, the optical connector indicating a loss value of a standard value (0.2 dB or greater) can be eliminated.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

D1: Maximum shaft diameter of guide pin
D2: Shaft diameter of groove portion of guide pin D3: Diameter of arc of pin holder
10, 10A, 10B, 10C: Guide pin-attached pin clamp
11, 11A, 11B, 11C: Pin clamp
12: Main body
13: Connection portion
14: Pin holder
14a: First arc
14b: Second arc
15: Guide pin
15a: Tip portion
15b: Rear end portion
15c: Shaft portion
15d: Groove portion
20: Ferrule
30: Optical connector

What is claimed is:

1. A ferrule pin clamp used for a ferrule into which a guide pin is inserted along a forward-rearward direction of the ferrule, the ferrule pin clamp comprising:
    two main bodies disposed in a width direction of the ferrule and each comprising a pin holder that:
        holds a groove portion of the guide pin,
        has a cutout that extends along an upward-downward direction of the ferrule, and
        has a pair of arcs facing each other in the width direction, wherein
        the forward-rearward direction, the width direction, and the upward-downward direction are orthogonal to each other; and
    a connection portion that connects the main bodies at a downward side of the main bodies in the upward-downward direction, wherein
    the main bodies are not connected to each other at an upward side of the main bodies in the upward-downward direction,
    a diameter of the pair of arcs:
        is smaller than a maximum shaft diameter of the guide pin, and
        is larger than a shaft diameter of the groove portion of the guide pin,
    the ferrule pin clamp has an opening that is located between the main bodies and that corresponds to a through hole of the ferrule into which an optical fiber is inserted, and
    the opening opens upward along the upward-downward direction, whereas the cutout opens downward along the upward-downward direction.

2. The ferrule pin clamp according to claim 1, wherein the pair of arcs has a clearance of 0.13 mm or smaller from the shaft diameter of the groove portion of the guide pin.

3. The ferrule pin clamp according to claim 1, wherein the pair of arcs has a clearance of 0.01 mm or larger from the shaft diameter of the groove portion of the guide pin.

4. The ferrule pin clamp according to claim 1, wherein the pair of arcs has a clearance of 0.05 mm or larger from the shaft diameter of the groove portion of the guide pin.

5. A guide pin-attached pin clamp comprising:
    the ferrule pin clamp according to claim 1; and
    the guide pin that comprises the groove portion.

6. An optical connector comprising:
    the ferrule pin clamp according to claim 1;
    the guide pin that comprises the groove portion; and
    a ferrule into which the guide pin is inserted.

7. The ferrule pin clamp according to claim 1, wherein the main bodies each have a plate shape.

8. The ferrule pin clamp according to claim 1, wherein the main bodies each comprises:
    a first arm portion connected to the connection portion,
    a bottom portion of the cutout, and
    a second arm portion connected to the first arm portion via the bottom portion.

* * * * *